(12) United States Patent
Hotelling et al.

(10) Patent No.: US 8,274,492 B2
(45) Date of Patent: Sep. 25, 2012

(54) INTEGRATED IN-PLANE SWITCHING

(75) Inventors: Steve Porter Hotelling, Los Gatos, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/269,330

(22) Filed: Oct. 7, 2011

(65) Prior Publication Data
US 2012/0026132 A1 Feb. 2, 2012

Related U.S. Application Data

(62) Division of application No. 11/818,422, filed on Jun. 13, 2007, now Pat. No. 8,040,326.

(51) Int. Cl.
*G06F 3/041* (2006.01)
(52) U.S. Cl. ...................................................... 345/173
(58) Field of Classification Search .................. None
See application file for complete search history.

(56) References Cited

U.S. PATENT DOCUMENTS

| | | | |
|---|---|---|---|
| 5,392,058 A | 2/1995 | Tagawa | |
| 5,422,693 A | 6/1995 | Vogeley et al. | |
| 5,483,261 A | 1/1996 | Yasutake | |
| 5,488,204 A | 1/1996 | Mead et al. | |
| 5,543,591 A * | 8/1996 | Gillespie et al. | 178/18.03 |
| 5,677,744 A | 10/1997 | Yoneda et al. | |
| 5,777,596 A | 7/1998 | Herbert | |
| 5,825,352 A | 10/1998 | Bisset et al. | |
| 5,835,079 A | 11/1998 | Shieh | |
| 5,847,690 A | 12/1998 | Boie et al. | |
| 5,880,411 A | 3/1999 | Gillespie et al. | |
| 6,188,391 B1 | 2/2001 | Seely et al. | |
| 6,239,788 B1 | 5/2001 | Nohno et al. | |
| 6,310,610 B1 | 10/2001 | Beaton et al. | |
| 6,323,846 B1 | 11/2001 | Westerman et al. | |
| 6,501,529 B1 | 12/2002 | Kurihara et al. | |
| 6,690,387 B2 | 2/2004 | Zimmerman et al. | |
| 6,885,495 B2 | 4/2005 | Liang et al. | |
| 6,982,432 B2 | 1/2006 | Umemoto et al. | |

(Continued)

FOREIGN PATENT DOCUMENTS

EP    1 133 057 A2    9/2001

(Continued)

OTHER PUBLICATIONS

Final Office Action mailed Feb. 16, 2011, for U.S. Appl. No. 11/818,422, filed Jun. 13, 2007, 16 pages.

(Continued)

*Primary Examiner* — Alexander Eisen
*Assistant Examiner* — Matthew Yeung
(74) *Attorney, Agent, or Firm* — Morrison & Foerster LLP

(57) ABSTRACT

This relates to adding multi-touch functionality to a display without the need of a separate multi-touch panel or layer overlaying the display. Instead, embodiments of the invention can advantageously utilize existing display circuitry to provide multi-touch functionality while adding relatively little circuitry that is specific to the multi-touch functionality. Thus, by sharing circuitry for the display and the multi-touch functionalities, embodiments of the invention can be implemented at a lower cost than the alternative of superimposing additional multi-touch related layers onto an existing display panel. Furthermore, since the display and multi-touch functionality can be implemented on the same circuit, they can be synchronized so that noise resulting from the display functionality does not detrimentally affect the multi-touch functionality and vice versa.

32 Claims, 15 Drawing Sheets

U.S. PATENT DOCUMENTS

| | | | |
|---|---|---|---|
| 7,015,894 | B2 | 3/2006 | Morohoshi |
| 7,184,064 | B2 | 2/2007 | Zimmerman et al. |
| 7,250,940 | B2 | 7/2007 | Jayanetti et al. |
| 7,663,607 | B2 | 2/2010 | Hotelling et al. |
| 7,705,834 | B2 | 4/2010 | Swedin |
| 8,040,326 | B2 | 10/2011 | Hotelling et al. |
| 2001/0020578 | A1 | 9/2001 | Baier |
| 2004/0150629 | A1 | 8/2004 | Lee |
| 2004/0189587 | A1* | 9/2004 | Jung et al. .................... 345/102 |
| 2006/0012575 | A1 | 1/2006 | Knapp et al. |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2008/0007533 | A1 | 1/2008 | Hotelling |
| 2008/0062147 | A1 | 3/2008 | Hotelling et al. |
| 2008/0158172 | A1 | 7/2008 | Hotelling et al. |
| 2008/0309627 | A1 | 12/2008 | Hotelling et al. |

FOREIGN PATENT DOCUMENTS

| | | |
|---|---|---|
| EP | 1 133 057 A3 | 9/2001 |
| EP | 1 133 057 B1 | 9/2001 |
| JP | 2000-163031 A | 6/2000 |
| JP | 2002-342033 A | 11/2002 |
| WO | WO-85/03374 A1 | 8/1985 |
| WO | WO-2004/046905 A2 | 6/2004 |
| WO | WO-2004-046905 A3 | 6/2004 |
| WO | WO-2005/036510 A1 | 4/2005 |
| WO | WO-2007/146780 A2 | 12/2007 |
| WO | WO-2007/146780 A3 | 12/2007 |
| WO | WO-2008/157249 A1 | 12/2008 |

OTHER PUBLICATIONS

International Search Report mailed Sep. 24, 2008, for PCT Application No. PCT/US08/66750, filed Jun. 12, 2008, four pages.

Non-Final Office Action mailed Sep. 8, 2010, for U.S. Appl. No. 11/818,422, filed Jun. 13, 2007, 20 pages.

Notice of Allowance and Allowability mailed Jun. 20, 2011, for U.S. Appl. No. 11/818,422, filed Jun. 13, 2007, nine pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

INTEGRATED IN-PLANE SWITCHING

CROSS-REFERENCE TO RELATED APPLICATIONS

This application is a divisional of U.S. patent application Ser. No. 11/818,422, filed Jun. 13, 2007, the entire disclosure of which is incorporated herein by reference for all purposes.

FIELD OF THE INVENTION

This relates to multi-touch panels in general and more specifically to integrating multi-touch functionality in a display.

BACKGROUND OF THE INVENTION

U.S. patent application Ser. No. 11/483,008 filed on Jul. 6, 2006 and entitled "Capacitance Sensing Electrode with Integrated I/O Mechanism" (incorporated by reference herein in its entirety) teaches capacitance based touch sensing. U.S. patent application Ser. No. 11/649,998 filed on Jan. 3, 2007 and entitled "Proximity and Multi-Touch Sensor Detection and Demodulation" (also incorporated by reference herein in its entirety) teaches a multi-touch sensing panel which can be combined with a display in a portable device. U.S. Provisional Pat. Application Nos. 60/804,361 and 60/883,979, both entitled "Touch Screen Liquid Crystal Display" (and both incorporated by reference herein in their entireties), show earlier designs for combining a multi-touch panels with display panels.

It can be advantageous for a multi-touch panel to be combined with a display to form an integrated multi-touch display panel. Such a display panel can provide an intuitive interface to many types of devices.

Existing schemes to combine a multi-touch panel with a display can involve mounting a transparent multi-touch panel on top of a display. Alternatively, some existing systems can provide for a higher level of integration, wherein some layers of the multi-touch panel can also act as layers of a display. However, these systems can require that the circuitry performing touch sensing be placed in different layers than circuitry associated with the display functionality. This can result in relatively expensive systems. Furthermore, the brightness of the display can be decreased, as the multi-touch related layers are usually not completely transparent.

SUMMARY OF THE INVENTION

This relates to adding multi-touch functionality to a display without the need of a separate multi-touch panel or layer overlaying the display. Instead, embodiments of the invention can advantageously utilize existing display circuitry to provide multi-touch functionality while adding relatively little circuitry that is specific to the multi-touch functionality.

Thus, by sharing circuitry for the display and the multi-touch functionalities, embodiments of the invention can be implemented at a lower cost than the alternative of superimposing additional multi-touch related layers onto an existing display panel. Furthermore, since the display and multi-touch functionality can be implemented on the same circuit, they can be synchronized so that noise resulting from the display functionality does not detrimentally affect the multi-touch functionality and vice versa.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the invention.

This relates to adding multi-touch functionality to a display without the need of a separate multi-touch panel or layer overlaying the display. Instead, embodiments of the invention can advantageously utilize existing display circuitry to provide multi-touch functionality while adding relatively little circuitry that is specific to the multi-touch functionality.

Thus, by sharing circuitry for the display and the multi-touch functionalities, embodiments of the invention can be implemented at a lower cost than the alternative of superimposing additional multi-touch related layers onto an existing display panel. Furthermore, since the display and multi-touch functionality can be implemented on the same circuit, they can be synchronized so that noise resulting from the display functionality does not detrimentally affect the multi-touch functionality and vice versa.

Figure 1:
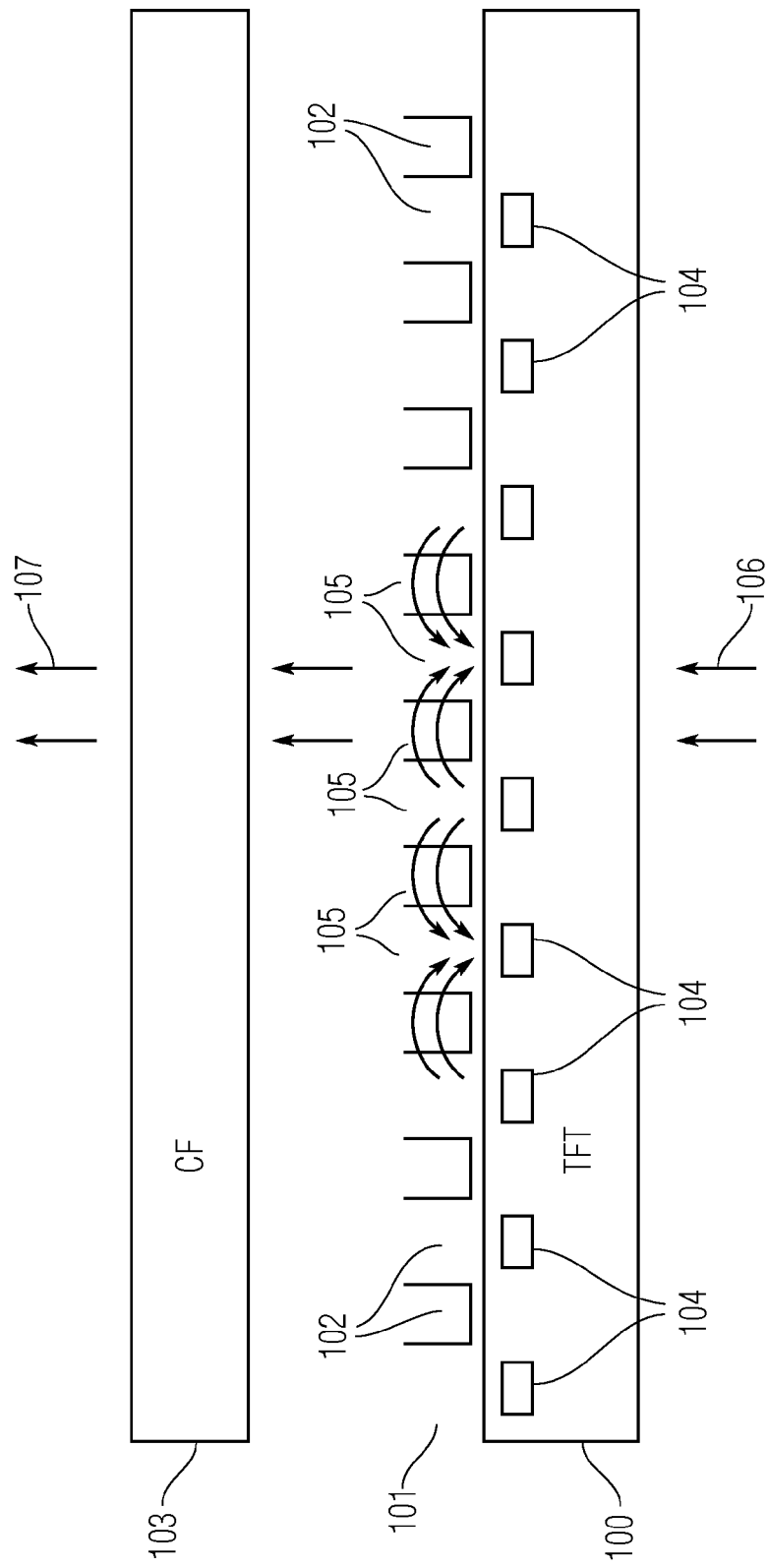
FIG. 1 is a side view of an existing in-plane switching (IPS) display.

FIG. 1 is a side view of an existing in-plane switching (IPS) display. An in-plane switching display can be characterized by the fact that all circuits associated with the display are placed within a single substrate layer. Thus, for the display of FIG. 1, all circuits can be placed within single thin film transistor (TFT) layer 100. While the TFT layer can itself include several layers within it, the TFT layer is usually not itself divided to make space for any non-electronic layers (such as, e.g., liquid crystal layers, etc.)

A liquid crystal layer (layer 101) can be placed above the TFT layer. The liquid crystal layer can include a plurality of liquid crystals, such as liquid crystals 102. Color filter layer 103 can be placed above the liquid crystal layer. Plurality of electrodes 104 can be placed within the TFT layer. The electrodes can be selectively excited by circuitry within the TFT layer. As a result, electric fields 105 can appear between various electrodes. The liquid crystals can bend as a result of these fields. Due to the bending liquid crystals, the polarity of light 106 traveling across layers 100 and 101 can change. The light can be blocked or allowed to pass the color filter layer 103 depending on its polarity. Therefore, the light that passes through the color filter layer (i.e. light 107) can be controlled by controlling the states of the various electrodes 104. Thus, the functionality of an exemplary liquid crystal display can be realized.

Figure 2:
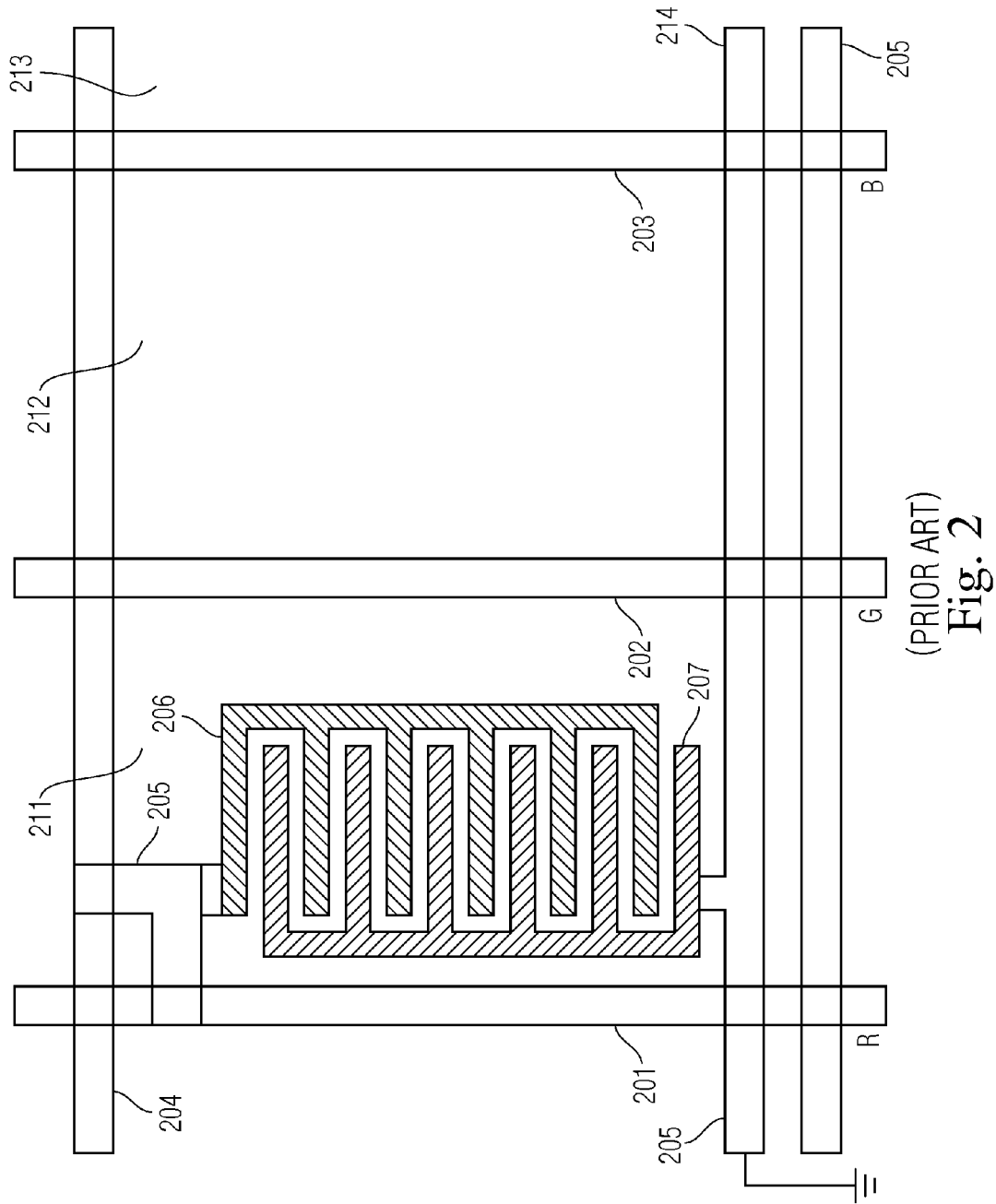
FIG. 2 is a top view of an existing IPS display.

FIG. 2 is a top view of an existing IPS display. The display can include a plurality of data lines, such as lines 201, 202 and 203. Various data lines can be associated with different colors. Furthermore, the screen can include a plurality of scan lines, such as scan lines 204 and 205. The scan lines are usually not directly connected to the data lines. A cell can be associated with an intersection of a scan line and a data line. For example, cells 211, 212 and 213 can be associated with the intersection of scan line 204 with data lines 201, 202 and 203, respectively. Three cells associated with different colors can be combined to form a pixel.

Cell 211 is shown in additional detail. A transistor 205 can be placed in the cell so scan line 204 connects to the gate of the transistor, while data line 201 connects to its source. The drain of the transistor can connect to electrode 206. Because of its shape, electrode 206 is often referred to as a comb electrode. Electrode 207 (another comb electrode) can be placed in proximity to electrode 206 as shown. The two comb electrodes can be placed in such a way so that their "teeth" are in proximity to each other, as shown. Electrode 207 can be connected to a predefined voltage, or ground through ground line 214. Alternatively, electrode 207 can be connected to the scanline for the next row 205. Electrode 206 can be excited, or driven by applying a voltage simultaneously through scan line 204 and data line 201. For that reason, electrode 206 can also be referred to as the driven electrode, while electrode 207 can be referred to as the counter electrode. Driving electrode 206 can result in a voltage differential between driven electrode 206 and grounded (or set at a different voltage) counter electrode 207. The voltage differential can create the lateral (i.e., substantially parallel to the screen surface) fields which are used to control the shape of the liquid crystals (see, e.g., liquid crystals 105 of FIG. 1). Comb electrode structures similar to the one of cell 211 can be provided for the other cells of the screen, including cells 212 and 213. The comb structure may have horizontal "teeth" as shown, vertical teeth, diagonal teeth, or teeth having other shapes (such as zig-zag shaped teeth, for example). Embodiments of the current invention can be compatible with any of these comb design shapes.

Embodiments of the invention provide for modifying the above described display functionality in order to realize multi-touch functionality by the same circuit. Accordingly, FIG. 3 shows an embodiment of the invention in which the cells of FIG. 2 are modified so that they can be used to sense touching of the screen in addition to their usual display related functions.

An additional line—counter data line 300—can be provided. Like data lines 201, 202 and 203, the counter data line can be vertical. Thus, it can be used for a plurality of pixels in a column, but each pixel in a row can be associated with a single counter data line. Persons of skill in the art will recognize there can be other configurations of the counter data line.

Similar to the other data lines, the counter data line can be connected to scan line 204 through a transistor, such as transistor 301. The scan line can be connected to the gate of the transistor and the counter data line to its source. A counter electrode line (line 302) can connect the drain of the transistor to counter electrode 207 as well as all other counter electrodes of the pixel (i.e., the counter electrodes associated with pixel cells 212 and 213). Therefore, while only cell 211 is shown, the other cells can be connected in a similar manner. It should be noted that in some embodiments line 302 may not extend beyond a single pixel it is associated with. If the counter data line is connected to ground, the cells can operate in a manner similar to the ordinary display circuit of FIG. 2, because when the select line is excited, it can place transistor 301 in conducting mode, which can result in all counter electrodes being connected to ground (through the counter data line) as they are in the circuit of FIG. 2.

Figure 3:
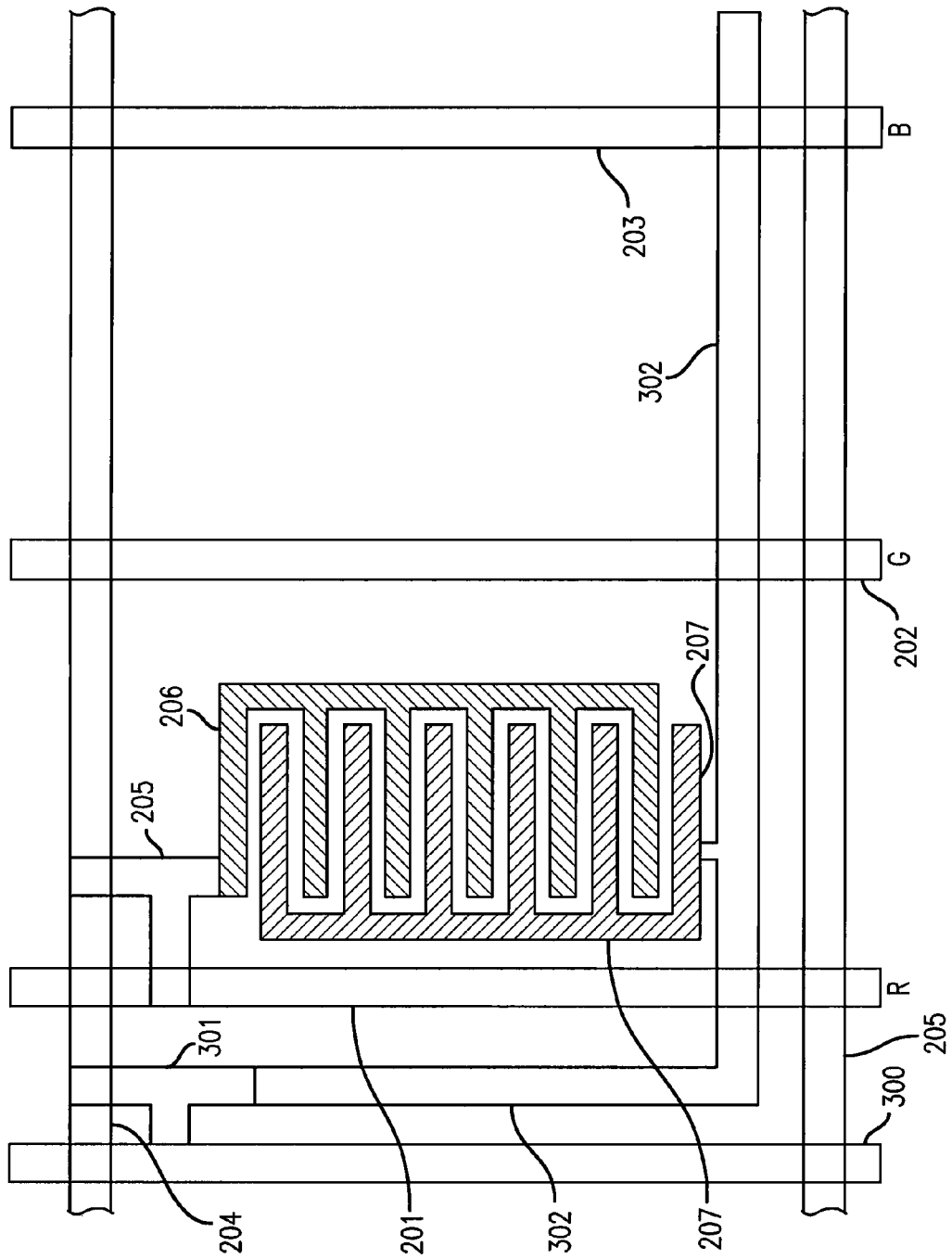
FIG. 3 is a top view of a multi-touch enabled display according to one embodiment of this invention.
Figure 4:
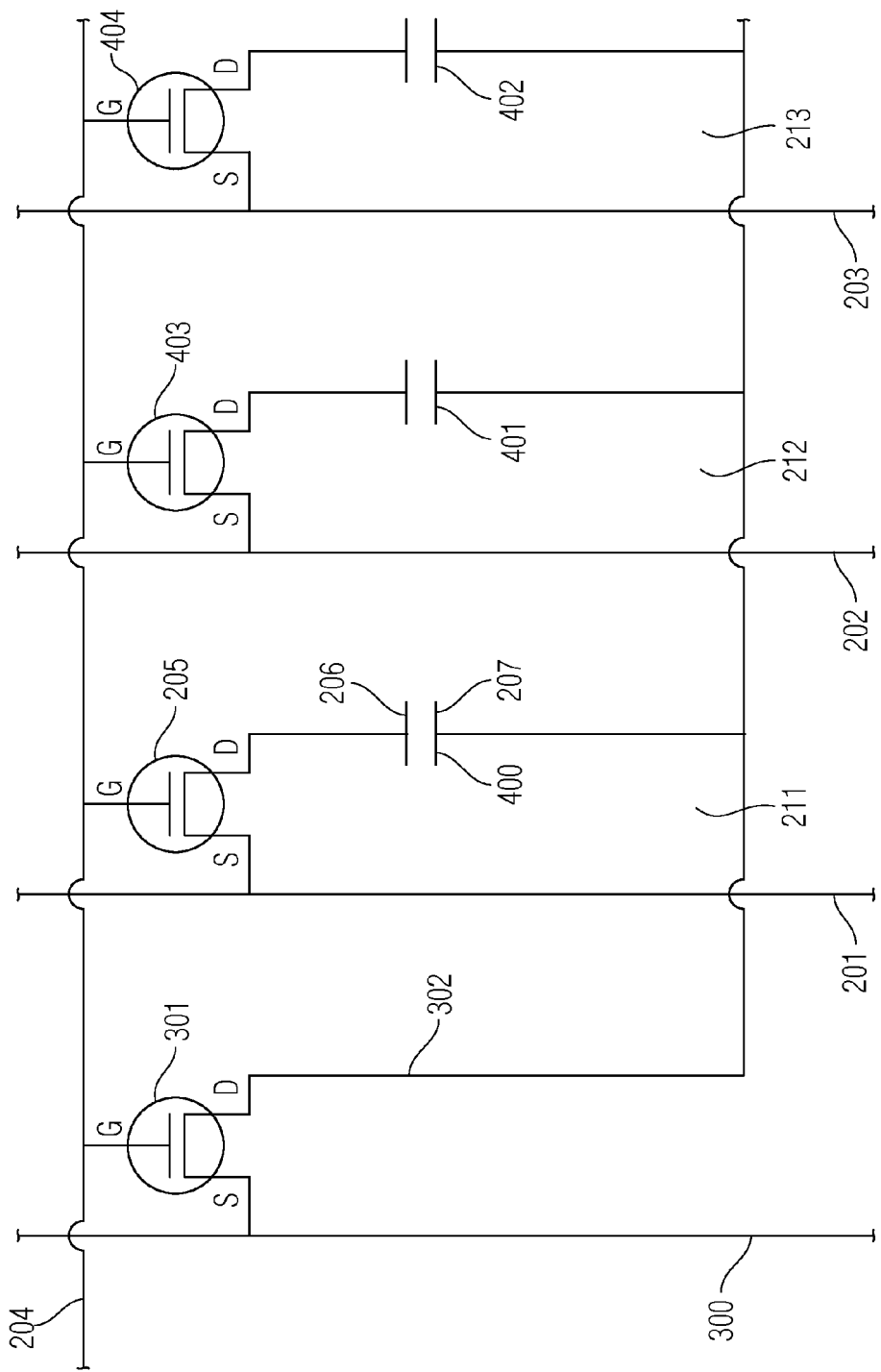
FIG. 4 is a schematic of an exemplary multi-touch enabled display according to one embodiment of this invention.

FIG. 4 is a schematic of the circuit of FIG. 3. As it can be seen, counter electrode 207 can be connected to counter data line 300 through transistor 301, while driven electrode 206 can be connected to data line 201 through transistor 205. Cells 212 and 213 can be similar to cell 211, including transistors 403 and 404, respectively. Capacitor 400 can reflect the capacitance formed between the two comb electrodes (206 and 207). Similarly, capacitors 401 and 402 can reflect capacitances formed in cells 212 and 213, respectively. A voltage appearing across any of the above capacitors can indicate a voltage difference between the driven and counter electrodes. As discussed above, such a voltage can cause fields between the electrodes to control the liquid crystals. In most displays, a voltage appearing across the capacitors can indicate that a light is being emitted by the display.

Figure 5:
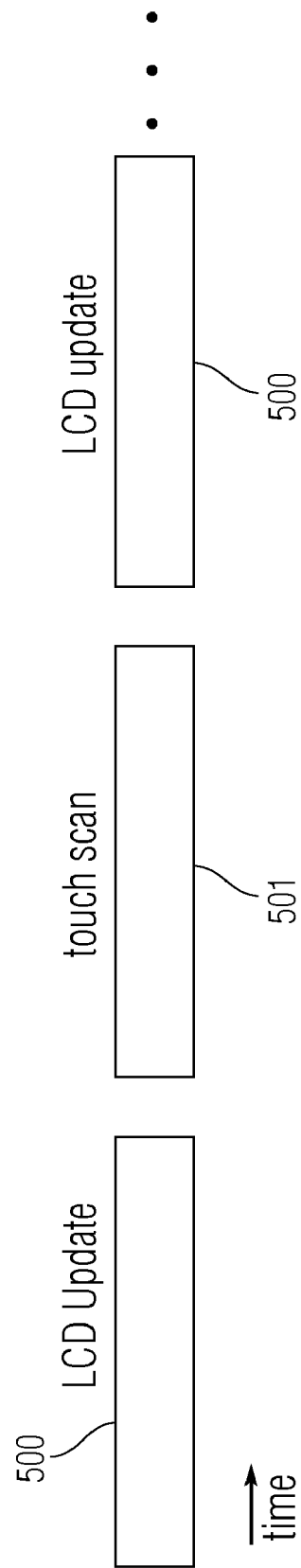
FIG. 5 is a timing diagram of the operation of an exemplary multi-touch enabled display according to one embodiment of this invention.

FIG. 5 shows a timing diagram of embodiments of the invention. As shown in FIG. 5, the screen can be interchangeably operated in LCD update 500 and touch scan 501 modes. While in LCD update mode, the screen can perform ordinary display related operations. While in touch scan mode, the screen can be scanned to detect touch events on the screen's surface. The screen can switch between modes at a relatively high frequency (e.g., 60 Hz) so that a human viewer may not be able to discern any flicker as a result of the change of modes.

During the LCD update mode all counter data lines (such as line 300) can be grounded (or alternatively set to a predefined voltage different from the voltage at which the driven electrodes are driven). This can result in ordinary display related operation of the circuit (as noted above).

Figure 6:
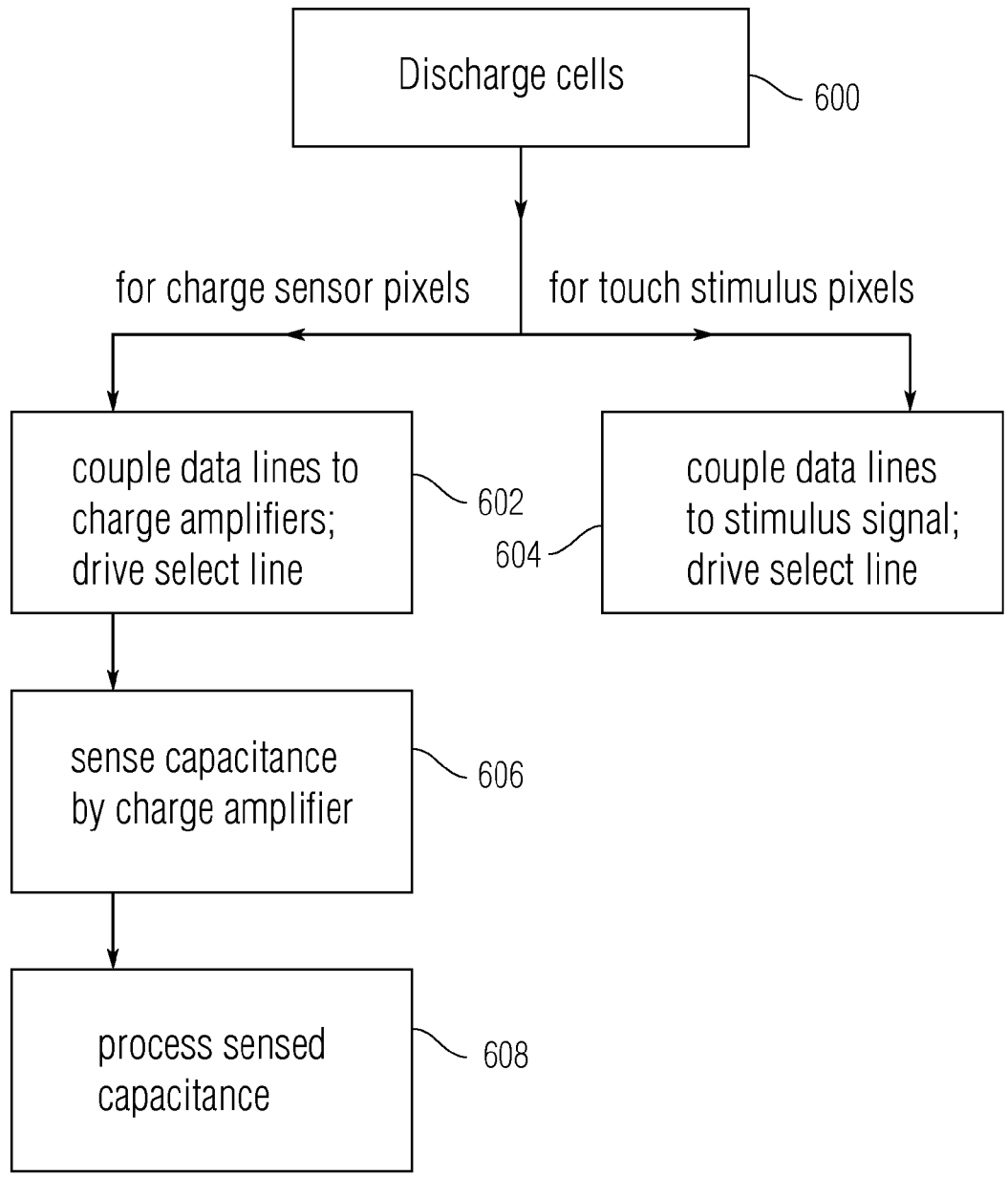
FIG. 6 is a flow chart showing an exemplary method of operation during the touch scan mode according to one embodiment of this invention.

FIG. 6 is a flowchart showing a method of operating the above described circuit during the touch scan mode. At the beginning of a given touch scan period the cells can be discharged (step 600). More specifically, the capacitors formed by the driven and counter electrode (such as capacitors 400, 401 and 402 of FIG. 4) can be discharged. This can be performed by connecting the driven and counter electrodes to the same voltage. For example, the driven and counter electrodes can both be grounded by (i) connecting all data lines including the counter data line to ground, and (ii) exciting the scan line of a particular row of cells (e.g., scan line 204). Thus, transistors 301, 205, 403 and 404 can all be placed in conducting mode and may, as a result, connect both electrodes of each capacitor to ground.

For most existing IPS LCD displays, the various cells can be excited on a row by row basis in order to implement the display functionality. Thus, a single row at a time can be excited by exciting its associated scan line, after which another row is excited, etc. After being excited the cells within a row can hold a charge in the capacitor formed by the driven and counter electrodes. That charge can affect the liquid crystals associated with these cells, so that the color(s) these cells are creating is preserved until the next time the scan line of a particular row is excited.

Figure 7:
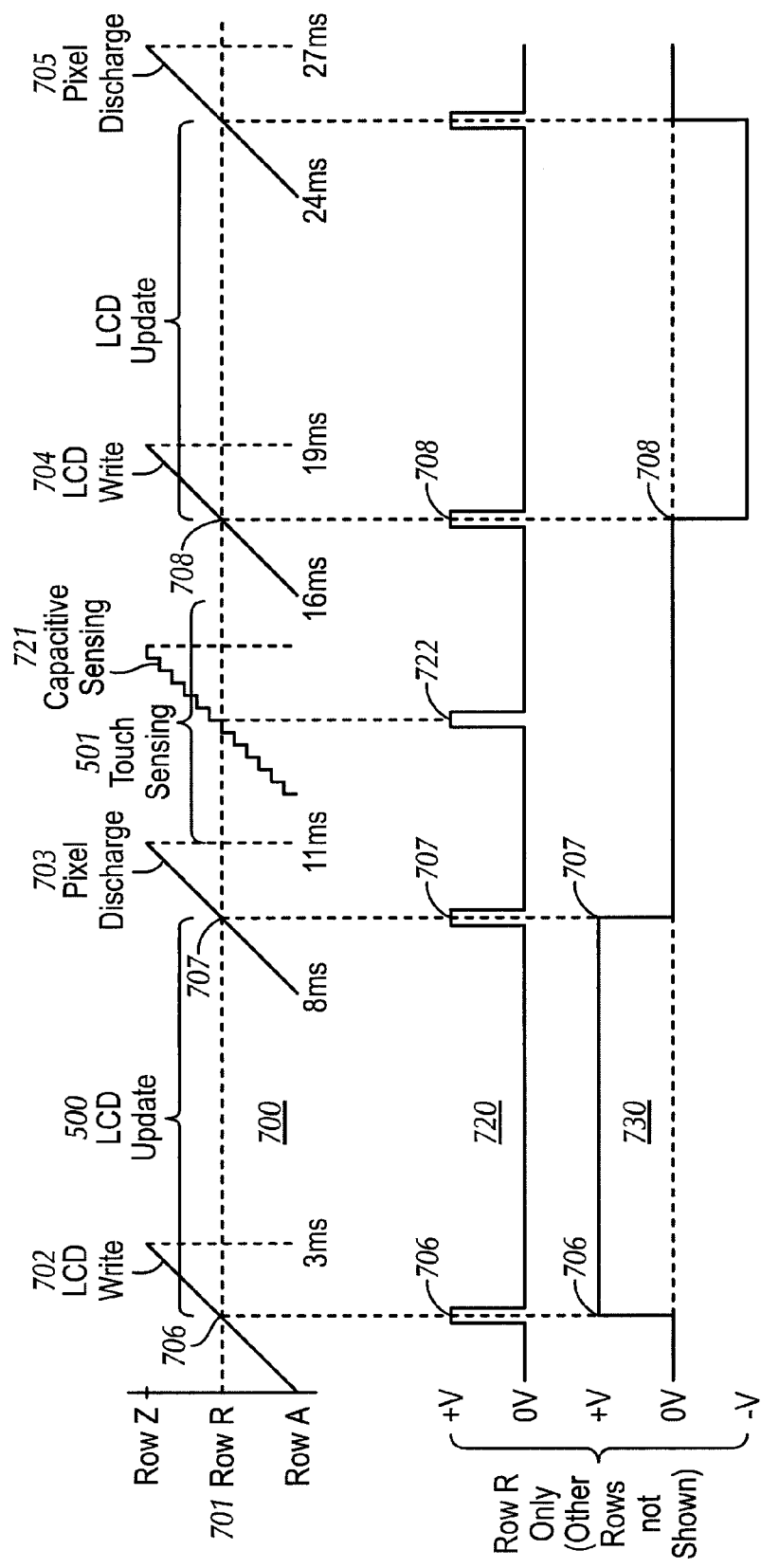
FIG. 7 includes several exemplary graphs illustrating the operation of one embodiment of this invention.

According to embodiments of the invention, the discharge step 600 may also be performed on a row by row basis. FIG. 7 includes several graphs illustrating the timing of step 600 and other aspects of the operation of embodiments of the invention. Chart 700 indicates the timing of the excitement of the various rows. The horizontal X-axis of chart 700 is associated with time, while the vertical Y-axis is associated with the row of a display. Broken line 701 can indicate the state of a specific exemplary row, which will be referred to as row R. Solid lines 702-705 can indicate an excitement of various select lines. In other words, every single point of any of lines 702-705 can indicate that the select line associated with a particular row (indicated by the Y coordinate of the point) is in an excited state at a particular time (indicated by the X coordinate of the point).

Lines 702 and 704 can be parts of LCD write operations, while lines 703 and 705 can be parts of pixel discharge operations. An LCD write operation can refer to exciting the driven electrode of a cell (and thus storing charge in the capacitor formed by the two electrodes of a cell) in order to cause the display to display a color (as described above in connection with FIG. 2). The discharge operation can be step 600 of FIG. 6. In one embodiment, the LCD write and pixel discharge operations can each last 3 ms, with a 5 ms period elapsing between each operation, as shown. In this case, each pixel can sustain the LCD voltage for 8 ms. After t=11 ms, the entire panel can be discharged, and touch sensing can commence. Since the same color and counter data lines can be time multiplexed between LCD operation and touch sensing operation, it can be necessary to wait for the entire panel to be discharged following LCD operation, prior to the beginning of touch sensing. The stair-case waveform 721 represents groups of LCD pixel rows being activated (i.e., connected to their respective color and counter data lines by sending a high voltage through their respective select lines), so that touch sensing can operate as shown. In this example, touch sensing can operate between t=11 ms and t=16 ms. At t=16 ms, the cycle can repeat.

Graph 720 shows the voltage of the scan line associated with row R. Thus, graph 720 can show, for example, the voltage of scan line 204. Graph 730 shows the voltage differential between the driven and counter electrodes in a cell of row R. In other words, graph 730 shows the voltage across the capacitor formed by the two comb electrodes of the cell (e.g., capacitor 400 of FIG. 4).

At point 706, the LCD write operation can be performed on row R. For that purpose, the select line associated with that row can be placed at a high voltage for a short period of time (see point 706 at graph 720) and as a result a voltage difference can appear across the capacitor of one or more cells in the row (see point 706 in graph 730). Between points 706 and 707, the capacitor can stay charged up, keeping a voltage differential between the comb electrodes and thus causing the various pixels within the row to perform display functionality. Therefore the period between points 706 and 707 for row R can correspond to an LCD update period for that row (see, e.g., period 500 of FIG. 5).

At point 707, the LCD update period may end. At point 722, the row may be connected to the columns for the purpose of touch sensing.

Touch sensing can be performed between t=11 ms and 16 ms. Thus, this period can correspond to the period 501 of FIG. 5. By performing the discharge step, some embodiments ensure that there is no voltage across the comb electrodes of each cell in a row during the touch sensing period (as shown in graph 730) in order to avoid lighting any pixels in the display as a byproduct of the touch sensing process. As noted above, a zero voltage differential between the comb electrodes usually causes no illumination in most existing IPS displays. In some embodiments, there can be an additional period 722 during which the voltage of the select line can be high. This can be desirable because a high select line voltage can be necessary to perform touch sensing functions (see more detailed discussion below).

At point 708, an LCD write is performed again and the above discussed process repeats. In some embodiments, the voltage across the comb electrodes can be inverted every other LCD write step (as shown in graph 730) by inverting the signals of the data lines.

Referring back to FIG. 6, after the cells have been discharged, the process can diverge for different cells based on the type of pixel each cell belongs to. For the purposes of touch sensing, the various pixels can be divided into two types—touch stimulus and charge sensor pixels. The type of each pixel can be predefined at the design stage or it can be assigned by the device and configured as part of a set up operation or during normal operation.

Figure 8:
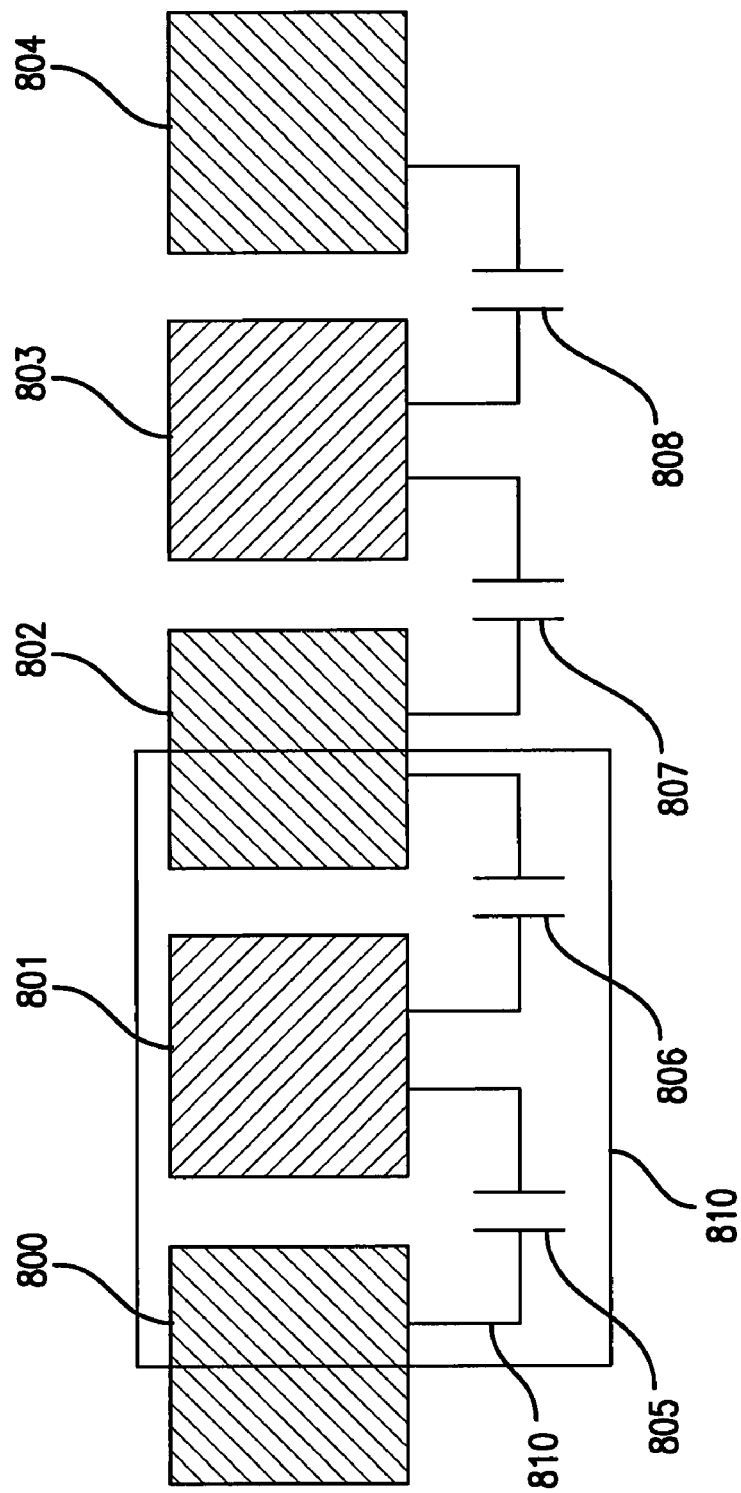
FIG. 8 is a diagram showing an exemplary charge sensor and touch stimulus regions according to one embodiment of this invention.

FIG. 8 is a diagram of a group of pixels of different types. Pixels 800, 802 and 804 can be touch stimulus pixels, while pixels 801 and 803 can be charge sensor pixels. Each pixel can include several conductive elements. More specifically, as noted above, each pixel can include three cells, each cell including two comb electrodes. The pixels can also include various conductive lines, such as portions of the data and scan lines. Consequently, capacitances can form between adjacent pixels. Thus, capacitances 805-809 can form between pairs of adjacent pixels as shown. The magnitudes of these capacitances can change if a user touches one or more of the pixels, because a user's finger can affect the electric fields between the conductors of adjacent pixels and thus change the capacitance between these pixels. In practice, for some embodiments the capacitance between two pixels can decrease by about 10% as a result of a touching of a pixel.

Thus, touch events on the screen can be measured by measuring any decreases of the mutual capacitance of adjacent pixels. This measurement can be performed by sending a stimulating signal to at least some of the electrodes of one adjacent pixel (a touch stimulus pixel) and measuring the charge of at least some of the electrodes of the other adjacent pixel. A more detailed explanation of using mutual capacitance to sense touch events on a panel can be found in U.S. patent application Ser. No. 11/649,998 discussed above.

For example, touch events in the proximity of pixel 801 can be detected by sensing changes of capacitances 805 and 806. In some embodiments, the sum of these capacitances can be sensed. If the sum of the capacitances is sensed, then touch sensing can be performed based on an area different and larger than the actual pixel size. More specifically, touch sensing can be performed based on area 810, which encompasses the entire pixel 801 as well as the neighboring halves of pixels 800 and 802. Area 810 indicates the area that if touched by a user can result in a significant change in the sum of capacitances 805 and 806. This area can be referred to as a touch pixel and can be larger than a display pixel. As shown in FIG. 8, the touch pixel can be the size of two display pixels.

In other embodiments the touch pixel size can be even larger if, for example, capacitances between pixel 801 and its vertical neighbors are also measured. Furthermore, the touch pixel size can also be increased by grouping several adjacent pixels into charge sensor and touch stimulus pixel regions. More specifically, elements 800-804 can each be groups of pixels instead of individual pixels. Thus, elements 800-804 can be multi pixel charge sensor/touch stimulus regions. Pixels can be grouped vertically as well as horizontally. Thus, regions 800-804 can each compose two rows and two columns of pixels.

In other embodiments, the touch pixel can be the size of, or even smaller than a pixel. As shown in FIG. 2 a pixel can include multiple cells. In most embodiments a pixel is composed of three cells associated with the primary colors. While in the previous discussion each pixel was considered as a whole for the purposes of touch sensing, in some embodiments the different cells of a pixel can be considered separately and can be individually (or in groups smaller than one pixel) designated as charge sensor or touch stimulus cells. Thus, in some embodiments, elements 800-804 can refer to particular cells of a pixel, instead of entire pixels or groups of pixels.

FIG. 6 shows how various pixels are reconfigured to serve the above discussed touch sensing roles. For touch stimulus pixels, some or all of the data lines of each pixel (including the counter data line) can be stimulated by being coupled to a stimulus signal (step 604). The stimulus signal can be used to provide a stimulation which causes charge buildup in charge sensor pixels in proximity to the touch stimulus pixels. In some embodiments the select lines associated with the touch stimulus pixel being stimulated (e.g., line 204) can be driven at high voltage in order to place transistors 301, 205, 403 and 404 in conducting mode thus connecting the data lines to the comb electrodes. In some embodiments, it can be ensured that the signal applied to the counter data lines is identical to signals applied to the various color data lines. The color data lines can drive the driven electrodes of the various cells, while the counter data lines can drive the counter electrodes of all cells of a pixel. Stimulating the counter and color data lines with the same signal can ensure that pairs of driven and counter electrodes are also stimulated with the same signal and no voltage differential occurs between the two electrodes. This can ensure that no lighting of the display results as a byproduct of the touch sensing process.

For charge sensor pixels, some or all of the data lines of each pixel (optionally including the counter data line) can be coupled to one or more charge amplifier circuits (step 602). The charge amplifier circuits can be used to measure the charge present in at least some of the conductors of these pixels, and detect any changes of that charge brought upon by changes of capacitance. In some embodiments the select line associated with the charge sensor pixels being processed can be driven at high voltage, in order to place transistors 301, 205, 403 and 404 in conducting mode thus connecting the data lines to the comb electrodes.

At step 606, the charge at the current charge sensor pixel may be measured by the charge amplifier. The measured charge can indicate the capacitance between the current charge sensor pixel and one or more neighboring charge stimulus pixels. At step 608, the sensed capacitance may be processed in order to determine whether or not the particular pixel is being touched. Processing can include demodulating a signal resulting from the charge amplifier, digitizing and/or averaging this signal. Processing is discussed in more detail in the above mentioned U.S. patent application Ser. No. 11/649,998.

It should be noted that while the method of FIG. 6 refers to a charge amplifier, another type of circuit can be used to sense capacitances. Also, while the method of FIG. 6 assumes that single pixels can be used for individual charge sensor and touch stimulus regions, as discussed above, multiple pixels can be grouped to form single charge sensor and touch stimulus regions. In other embodiments, a single pixel can include more than one charge sensor and/or touch stimulus region.

A person skilled in the art would recognize that many of the above discussed embodiments can require the ability to drive multiple select lines at the same time. This may be the case, for example, if the charge sensor/touch stimulus regions include multiple rows of pixels, or if the high select line periods (e.g., periods 721 of FIG. 7) of different rows overlap. Therefore, some embodiments of the invention may need to be configured so that multiple select lines can be driven at the same time (this is not the case for many existing LCD displays which only provide that one select line that may be high at a given time).

Figure 9:
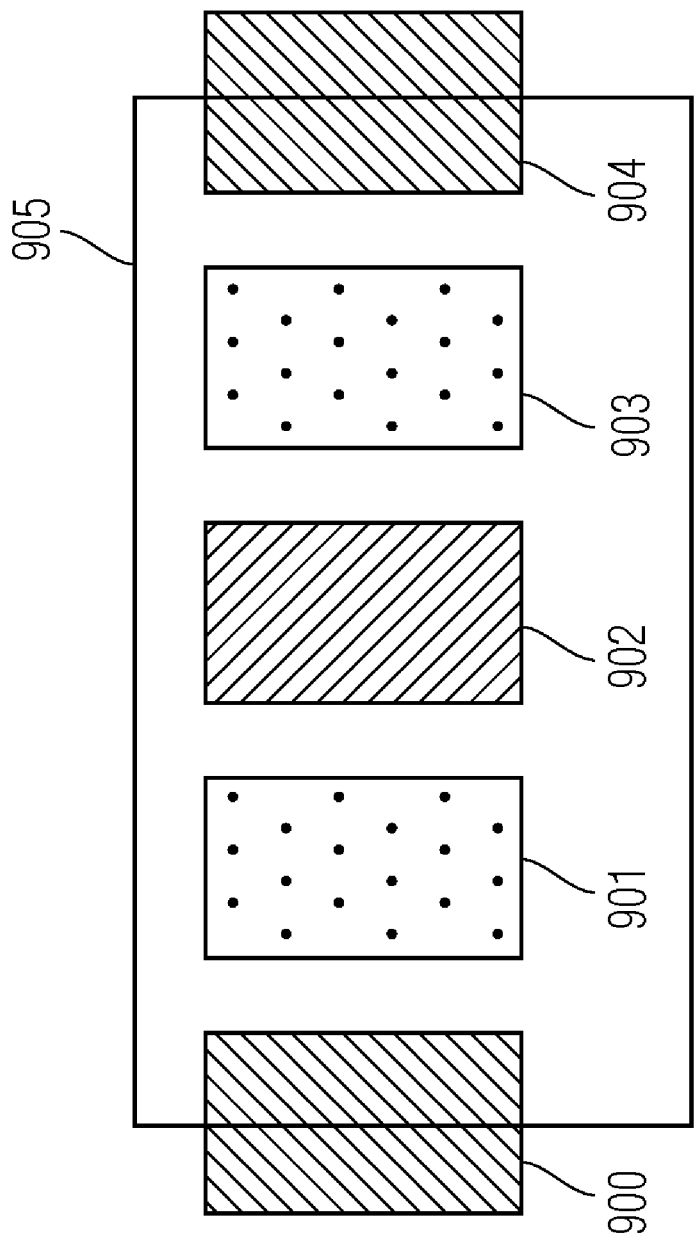
FIG. 9 is a diagram showing an exemplary charge sensor, touch stimulus and guard regions according to one embodiment of this invention.

FIG. 9 shows another embodiment of the invention. In this embodiment, a third type of region—a guard region can also be present. Guard regions can be placed between charge sensor and touch stimulus regions and used to shield some electric fields between their neighboring regions. Thus, charge sensor region 902 can be separated from neighboring touch stimulus regions 900 and 904 by guard regions 901 and 903. The configuration of FIG. 9 can result in touch pixel 905. Similar to the touch stimulus/charge sensor regions, the guard regions can include one or more pixels or one or more parts (cells) of a pixel. The guard regions need not be the same size as the touch stimulus/charge sensor regions. The guard regions can be configured during the touch scan mode by grounding all data lines and driving the select line(s) associated with these regions.

Figure 10:
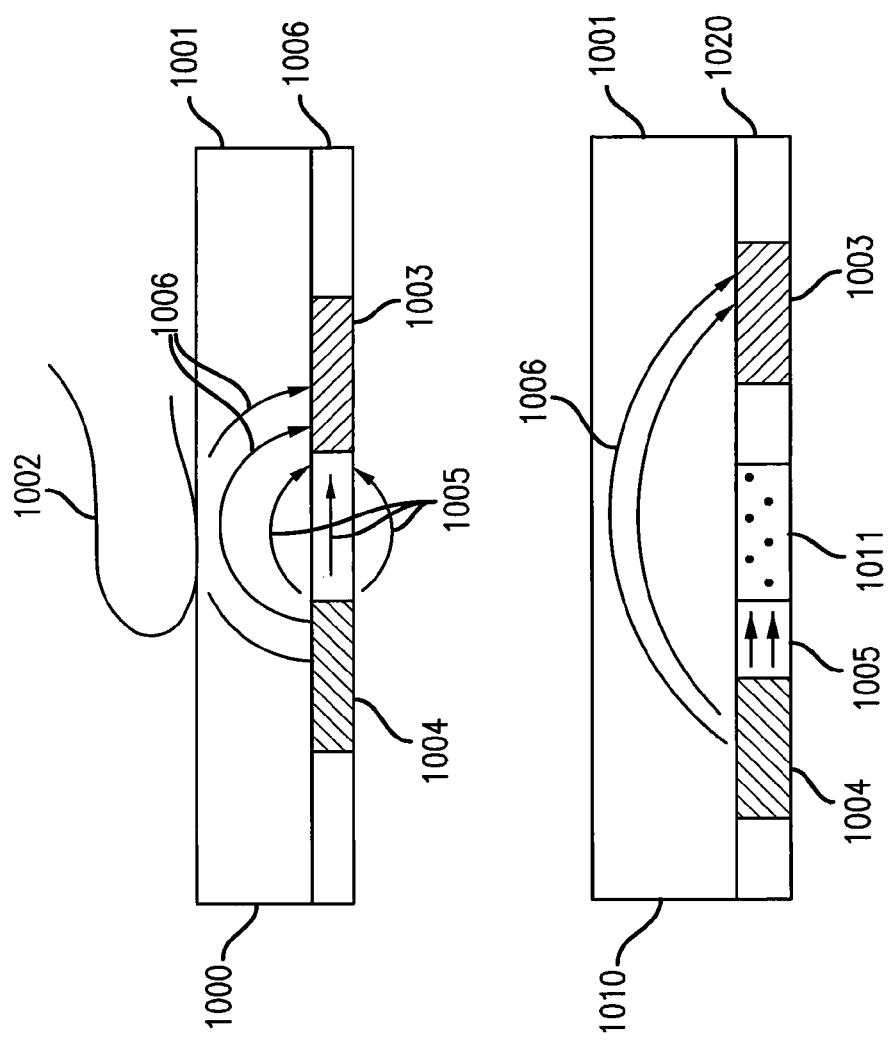
FIG. 10 includes two side views of an exemplary embodiment of the invention which illustrate the purpose of guard regions.

FIG. 10 includes two side views of an embodiment of the invention which illustrate the purpose of guard regions. Diagram 1000 shows a multi-touch enabled display that does not feature any guard regions. A TFT layer 1006 of the multi-touch display can include at least one touch stimulus region 1004 and one charge sensor region 1003. A top layer 1001 can be placed over the charge stimulus layer. The top layer can include liquid crystals, filters, a cover glass, etc. A finger 1002 can be pressed against the top layer.

Without the finger, various electric fields, including fields 1006 and 1005 can exist between regions 1004 and 1005. The fields can be caused by the capacitance between these two regions. When a finger is placed against the display, some of the fields—e.g., fields 1006—can be at least partially removed or shunted by the finger. This can reduce the capacitance between the two regions. However, fields 1005 may be unaffected by the finger. Therefore, the capacitance contributed by fields 1005 can remain even if a finger is present.

It may be desirable to maximize the fields (or the electromagnetic flux) that exist between the regions when no finger is pressing against the glass, but are removed or reduced by the presence of a finger. This can allow for a maximum difference in capacitance between "touch" and "no touch" events, thus allowing for easier detection of touch events. Therefore, it may be desirable to minimize the fields that are not affected by the presence of a finger (i.e., fields 1005).

Diagram 1010 shows how guard regions can be used to reduce fields 1005. Diagram 1010 shows a configuration similar to that of diagram 1000, that also includes a guard region (region 1011) placed between regions 1004 and 1005.

The guard region need not affect desirable fields 1006. However, the guard region can block undesirable fields 1005. Since the guard region can include grounded conductors (e.g., the data lines and the comb electrodes connected to the data lines) it can shield at least some of the fields that would have otherwise passed through it.

It should be noted that diagrams 1000 and 1010 may illustrate an ideal result. In practice, some of the undesirable flux represented by fields 1005 can pass regardless of the existence of a guard region. However, even blocking some of the undesirable fields can prove beneficial for the resolution of the overall system.

It should be noted that additional fields extending below the TFT layer can also exist. These fields are not shown in FIG. 10. According to some embodiments, these fields can be at least partially removed by placing conductors below the TFT layer.

Figure 11:
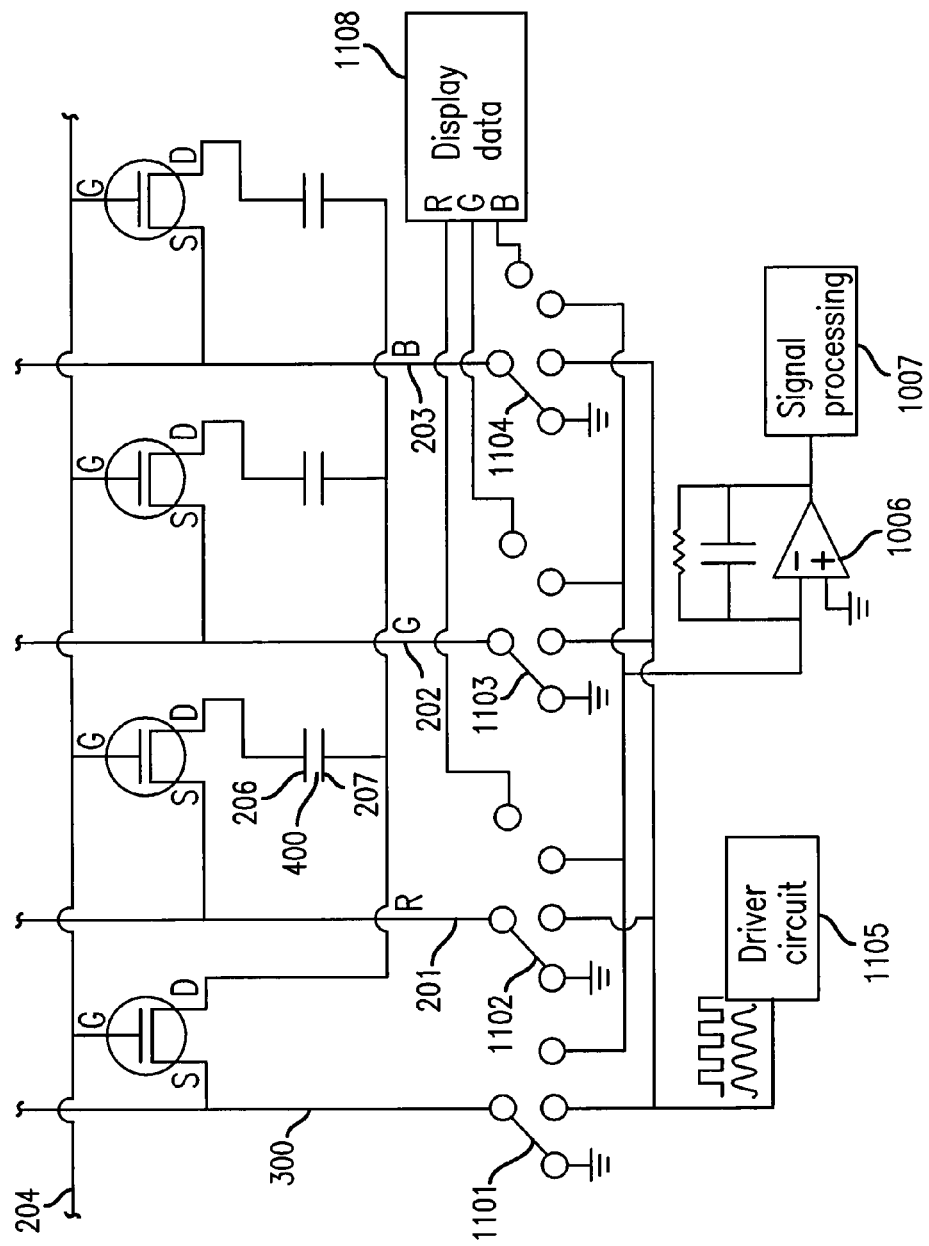
FIG. 11 is a schematic of an exemplary multi-touch enabled display according to one embodiment of this invention.

FIG. 11 shows an exemplary schematic of a pixel and additional circuitry for processing data at the counter and color (R, G, B) data lines according to some of the above discussed embodiments. It should be noted that the additional circuitry can be common to all pixels that share the same counter and color data lines (e.g., all pixels in the same column as the pixel shown in FIG. 11). The counter data line can be connected to a switch 1101. The color data lines can be connected to switches 1102, 1103 and 1104, respectively. Different types of known switching elements can be used for the switches, such as, e.g., solid state switches (e.g., transistor based switches) or microswitches. The first (leftmost) position of each switch can be connected to ground. The counter data line can be connected to ground when the pixel is in LCD update mode 500. Alternatively, during LCD update mode, the counter data line can be connected to a programmed voltage that alternates between two preset voltage values. This can facilitate generating voltages across the pixel that alternate in alternating frames, such as frame inversion, row inversion, or pixel inversion. Furthermore, all data lines can be connected to ground, or a predefined voltage, when the pixel is in touch scan mode 501, and the pixel is configured as part of a guard region.

All data lines can be connected to driver circuit 1105 (the second leftmost position of each switch) when the pixel is in the touch scan mode and the pixel is configured as part of a touch stimulus region. The driver circuit can be a circuit configured to provide a driver signal. The driver signal can be a sinusoidal signal, a square wave signal or any other type of signal that may be found suitable for touch sensing purposes. All data lines can be connected to charge amplifier circuit 1106 when the pixel is in the touch scan mode and configured to serve as part of a charge sensor region. The charge amplifier circuit can be used to sense the capacitance between the present pixel and one or more neighboring charge stimulus pixels (e.g., capacitances 805, 806 of FIG. 6). A signal processing circuit 1107 can also be provided to process data produced by the charge amplifier circuit.

The color data lines (data lines 201, 202 and 203) can be connected to display data circuit 1108 (the rightmost position of their switches) when the pixel is in the LCD update mode. As noted above, in that mode the counter data line 300 can be connected to ground or to a voltage alternating between two preset voltage values to facilitate pixel voltage inversion (frame inversion, row inversion or pixel inversion).

In some embodiments, a single driver circuit can be used for all pixels. The number of charge amplifier and signal processing circuits used can depend on the number of charge sensor regions on the screen. In one embodiment, the charge sensor regions can be processed on a row by row basis, thus the number of charge amplifier and signal processing circuits can be equal to the number of charge sensor regions in a given row. Accordingly, pixels that are in the same charge sensor region or in different charge sensor regions in the same column can be connected to a single set of charge amplifier and signal processing circuits 1106 and 1107. In other embodiments, there can be a set of charge amplifier and signal processing circuits, for each column of charge sensor pixels, for each charge sensor pixel, for each column of pixels or even for each pixel.

In some embodiments, various pixels can be permanently designated as charge sensor, touch stimulus or guard pixels. Therefore, some of these pixels may not have as many possible states of their switches. For example, if a pixel is permanently designated as a touch stimulus pixel, switches 1101-1104 can lack an option for connecting to the charge amplifier 1106. In other embodiments, the connections of FIG. 11 can be preserved as to allow the touch scan mode roles of the various pixels to be dynamically changed.

It should be noted that the above discussed embodiments can provide that the cells of the pixels are to be discharged upon entering the touch scan mode (see, e.g., step 600 of FIG. 6). Since the orientation of the liquid crystals depends on the voltage across the electrodes of the pixels, discharging the pixels during touch scan mode can affect the liquid crystals and may thus affect the color of the display. In some embodiments, the liquid crystal response time can be slower than the touch scan mode period. Thus a pixel may not actually go dark during the touch scan mode as a result of the discharge. However, as the average or, more precisely, the root means square (RMS) voltage applied across the electrodes of the pixel affects the position of the liquid crystals and consequently the color of the pixel, the touch scan period can affect the color of the pixel. Since the voltage across the electrodes of cells is zero during the touch scan period, this can reduce the average voltage and thus affect the color of the pixel (e.g., by reducing the brightness).

Consequently, in order to ensure that the color is the same as it would be if no touch scanning were performed, the voltages with which the various pixels are excited during the LCD update (i.e., the voltages applied across the various color data lines during LCD update) can be increased to compensate for the touch sense period and keep the RMS the same as it would have been if there were no touch sense period. This can ensure that performing touch sensing as discussed above does not noticeably affect the display functionality. However, increasing the color data line voltages can result in higher power requirements for the display.

FIGS. 12-15 show alternative embodiments of the invention which do not necessarily require that the pixels be discharged during touch scan mode. Instead, the pixels can be kept at their original charge. Thus, higher power need not be used during the LCD update mode. Consequently, the embodiments of FIGS. 12-15 can be more efficient than the above discussed embodiments.

Figure 12:
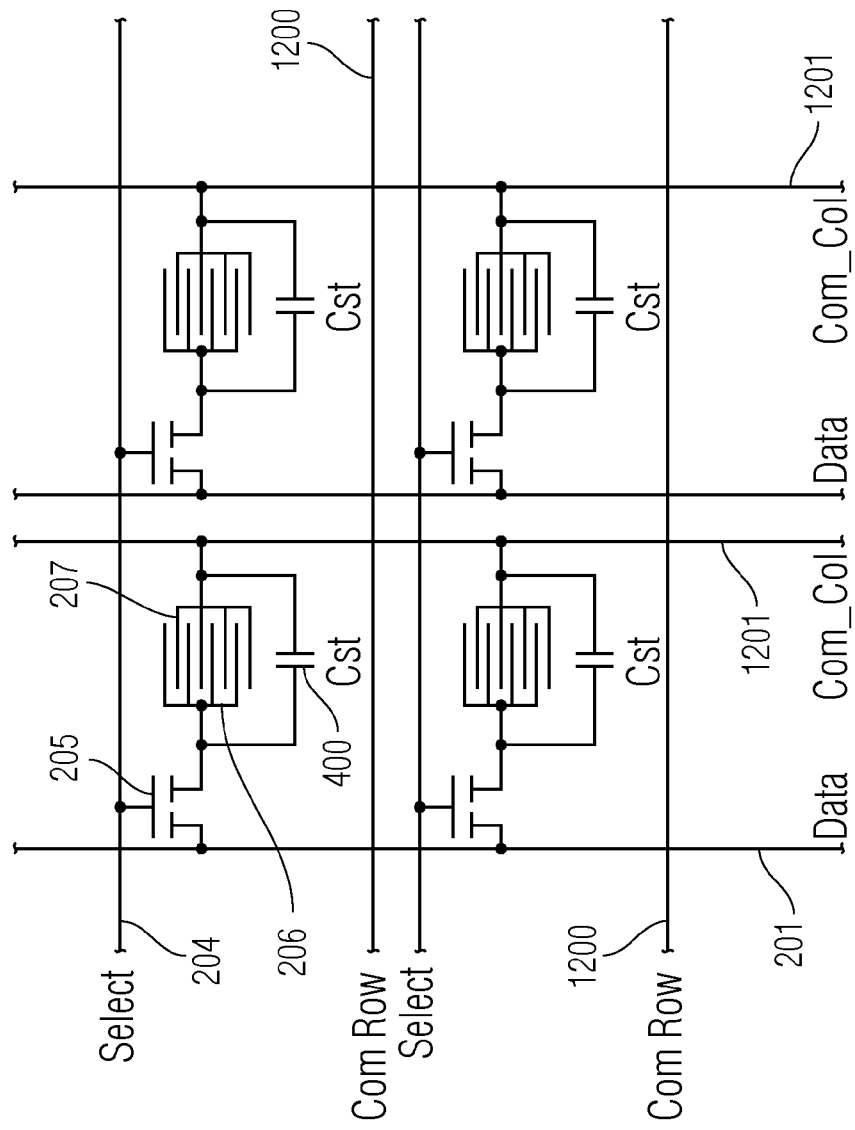
FIG. 12 is a diagram showing exemplary type A cells according to one embodiment of this invention.

According to alternate embodiments of the invention, the cells of a display can be divided into two types—type A and type B. FIG. 12 shows a plurality of type A cells. These cells can be similar to the cells of FIG. 2. The cells can include transistor 205 whose gate can be connected to select line 204 and whose source can be connected to color data line 201. The drain of the transistor can be connected to driven comb electrode 206 which is placed in proximity to counter comb electrode 207. A capacitance 400 can exist between the electrodes. This capacitance can be composed of the liquid crystal capacitance as well as an extra storage capacitor that can be created using parallel plates in the metal layers of the TFT (a common practice in existing IPS LCD displays). The cells of FIG. 12 can be distinguished from those of FIG. 2 in that additional common row 1200 and common column 1201 lines can be provided. Counter electrodes 207 of the type A cells can be connected to the common column lines (lines 1201). As can be seen, the common column lines can be unused for the type A cells. While FIG. 12 illustrates a 1:1:1 ratio between display pixels to common column lines to common row lines, other ratios are possible, such as 3:1:1 or 3:3:1 or 3:1:3. The use of a higher ratio of display pixels to common lines can minimize the aperture ratio loss associated with the extra common lines.

Figure 13:
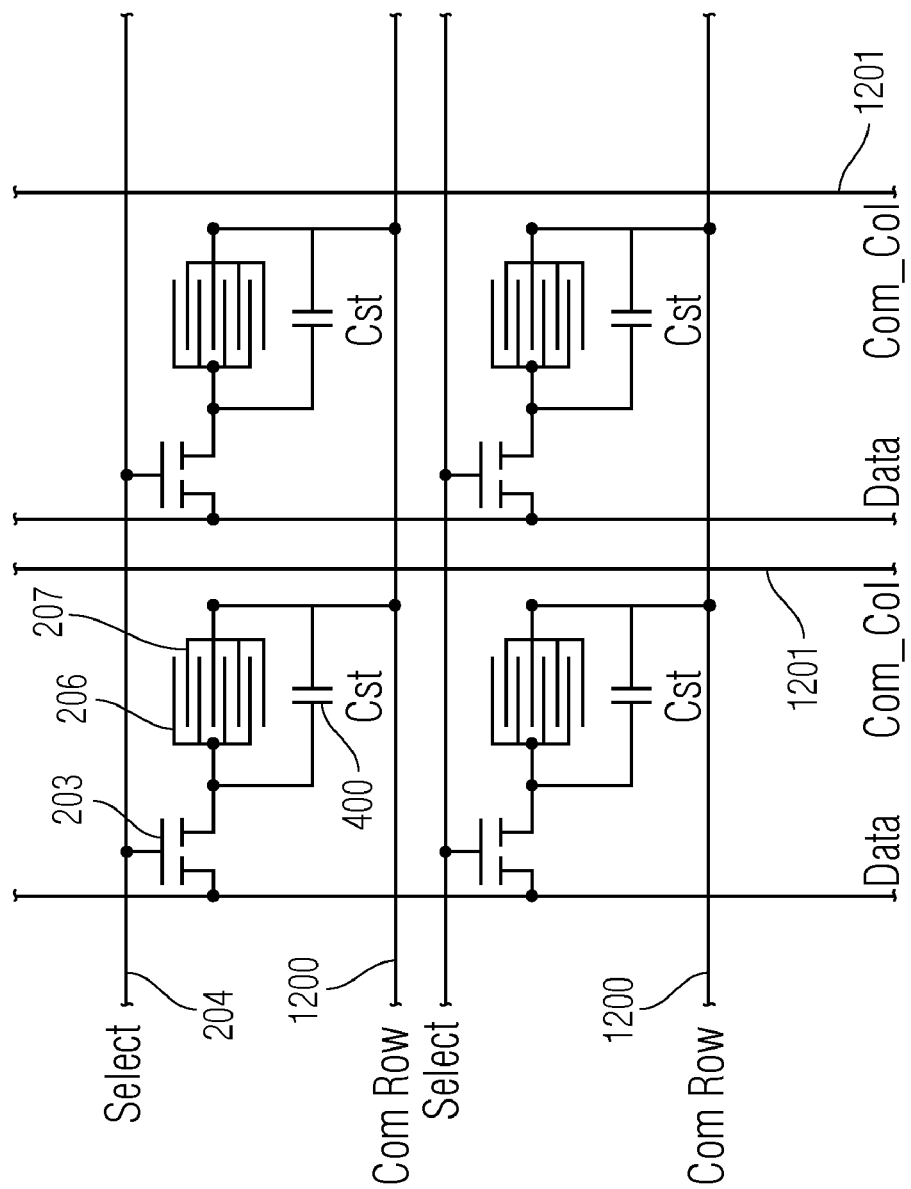
FIG. 13 is a diagram showing type B cells according to one embodiment of this invention.

FIG. 13 is a diagram showing a plurality of type B cells. The type B cells can be similar to the type A ones with the distinction that the counter electrodes are connected to the common row lines (lines 1200) instead. In addition, the type B cells can be designed to provide an equal aperture ratio as the A cells, so that the optical display performance is indistinguishable between A and B cells. This can ensure that there is no display artifact associated with the differences between type A and type B cells.

Figure 14:
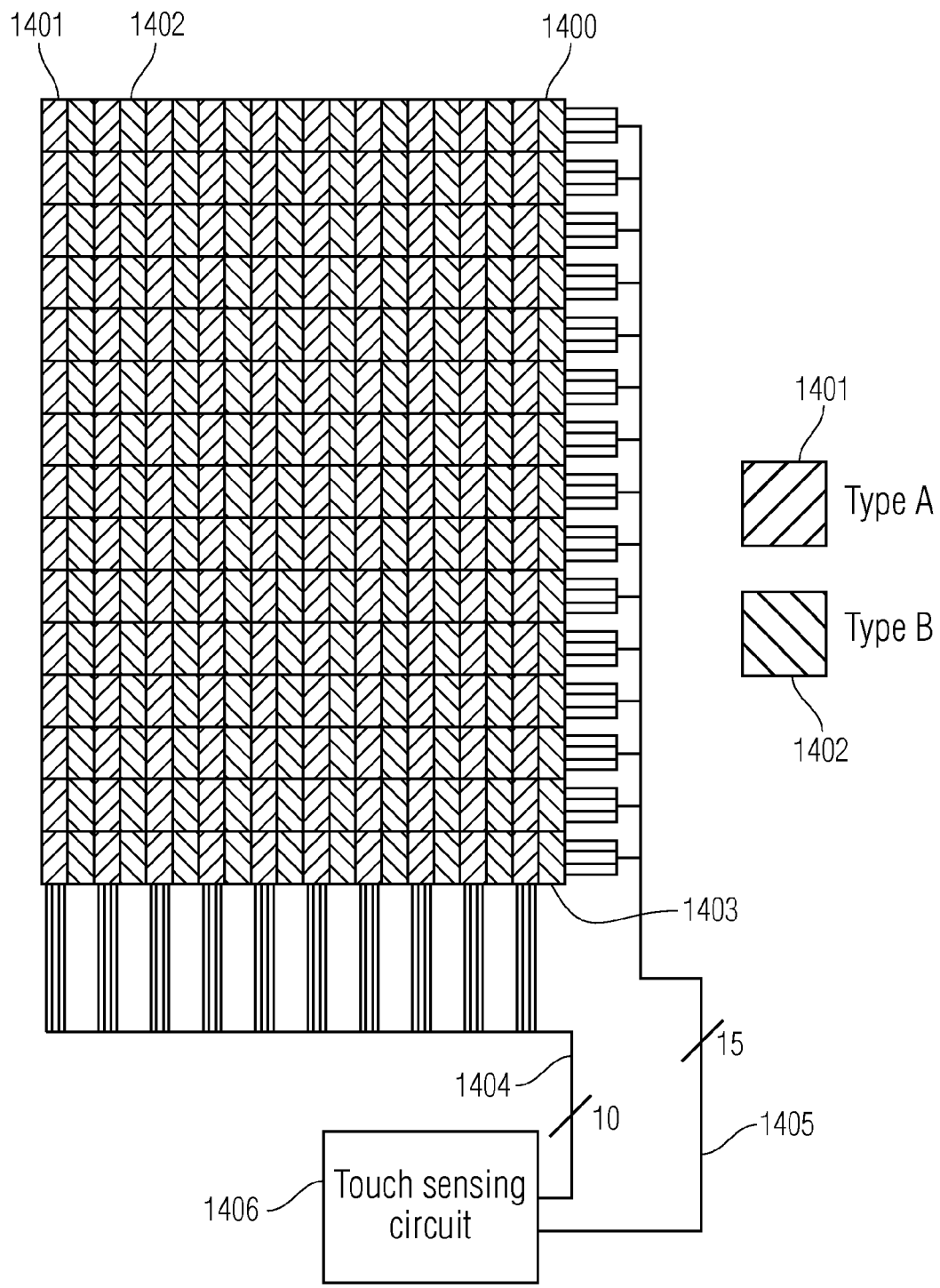
FIG. 14 is a diagram of an exemplary touch sensing display according to one embodiment of this invention.

FIG. 14 is a diagram of an exemplary display. The cells in the display can be grouped into touch pixels, such as touch pixel 1403. As discussed above, the touch pixels can include one or more cells and/or one or more display pixels. The cells and/or pixels included in a touch pixel can be positioned in single or multiple adjacent rows and/or columns. The touch pixels of the display can be divided into type A regions 1401 and type B regions 1402. In some embodiments the divisions can be made based on vertical stripes, as shown. The number of touch pixels of the display can be different than shown.

According to one embodiment, each type A or B region can be a rectangle with a height twice the size of its width. Thus, for example, the width can be 2.5 mm and the height can be 5 mm. Since the embodiments of FIG. 14 can sense touch events by using a combination of type A and type B pixels, the size of a touch pixel may be about twice the width of an individual type A or B region (this is similar to the setup of embodiments discussed in connection with FIG. 8). Therefore, using the above discussed sizes can result in square touch pixels.

The various common row and common column lines can be sent through busses 1404 and 1405 to a touch sensing circuit 1406. The touch sensing circuit can also be connected to the data lines of the display (not shown). An advantage of the stripe based positioning of the type A and type B regions, can be that half of the common column lines need not be connected to the touch sensing circuit as they are associated with type B touch pixels only. In fact, in some embodiments, the common column lines that are only associated with type B pixels can be entirely removed from the circuit.

Figure 15:
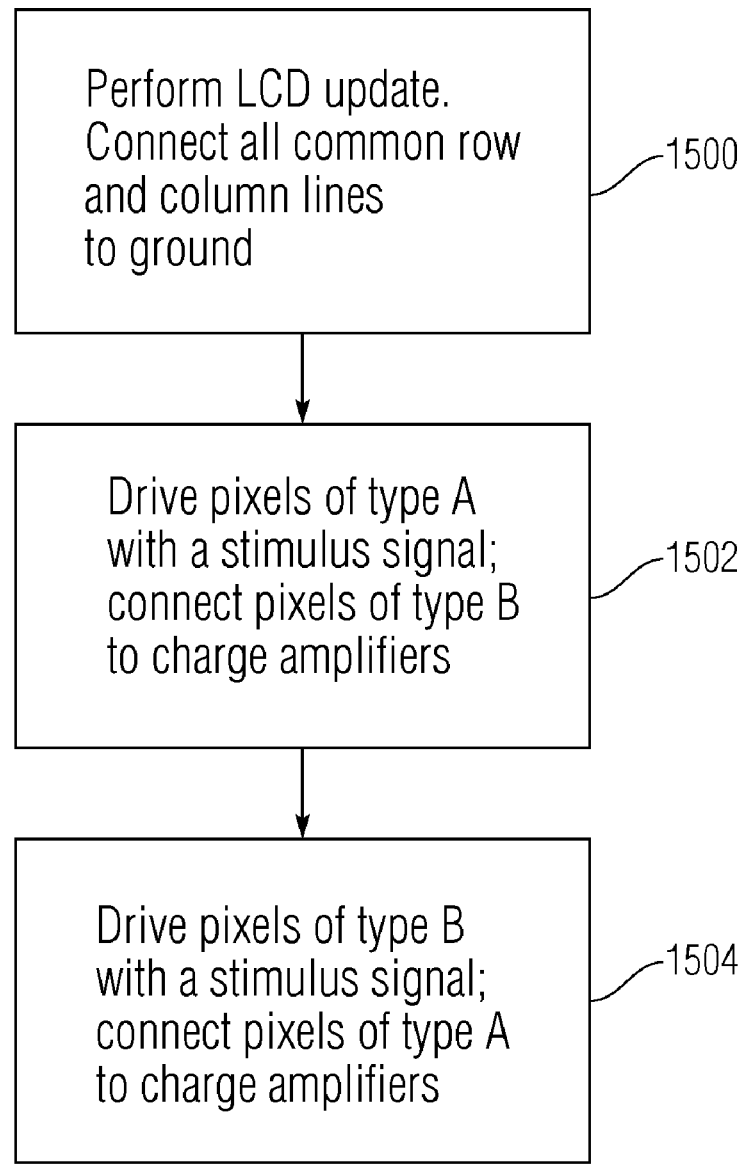
FIG. 15 is a flow chart showing a method of operation of one embodiment of this invention.

FIG. 15 is a flowchart showing a method of operation of embodiments of the invention of the type shown in FIGS. 12-14. At step 1500, an LCD update may be performed. In this step, the touch sensing circuit can connect all common row and column lines to ground. Since both the common row and column lines are connected to ground, the counter electrode of each cell (regardless of whether it is of type A or type B) can be also connected to ground. Therefore, each cell can be configured in a manner similar to the cells of FIG. 2. Thus, during step 1500, the display can operate in a manner similar to that of ordinary LCD displays. In some embodiments, step 1500 can take about 12 ms.

At step 1502, the display can switch from LCD update mode 500 to touch scan mode 501 (see FIG. 5). However, as opposed to the previously discussed embodiments, no discharge of the pixels needs to be performed. Thus, all pixels and cells within them can be allowed to keep their current internal charge (the charge being held by the capacitors formed between the driven and counter electrodes of each cell). At step 1502, touch pixels of type A can be driven with a stimulus signal. The stimulus signal can be a signal oscillating around 0V. For example, the stimulus signal can be a 5V peak to peak sine wave signal oscillating around 0V. The touch pixels of type A can be driven by driving the common column lines associated with these touch pixels.

The touch pixels of type B can be connected to charge amplifiers or similar circuits designed to sense the charge at these touch pixels. This may be done by connecting the common row lines associated with these touch pixels to the charge amplifiers. The outputs of the charge amplifiers can be processed to sense changes of capacitance between a touch pixel of type B and a neighboring stimulated touch pixel of type A. Such changes can signify touch events. Thus, during step 1502, touch events can be detected based on measurements obtained from pixels of type B. In some embodiments, step 1502 can last about 2 ms.

Step 1504 may be similar to step 1502 but the roles of touch pixels of types A and B may be reversed. In other words, during step 1504, the touch pixels of type B can be stimulated (by driving the common row lines), while the touch pixels of type A can be connected to charge amplifiers in order to detect touch events (by connecting the common column lines to the charge amplifiers). In some embodiments, step 1504 can also last 2 ms. After step 1504 is completed, a single touch scan of the display may be completed, and the process may proceed back to step 1500 in which the display changes back to LCD update mode.

According to some embodiments, the select lines may not be excited during the touch sensing mode (i.e., steps 1502 and 1504). Thus the various transistors of the cells (e.g. transistor 205) can be left in a non-conducting state. Therefore, the data lines can be disconnected from the various cells during touch sensing. Thus, in ideal conditions, the state of the data lines can be irrelevant during touch sensing. However, in practice the state of the data lines can affect the cells during touch sensing due to a capacitance across transistor 205. In some embodiments, all data lines can be grounded during steps 1502 and 1504. Consequently, any effect the data lines have on the cells can be kept roughly symmetrical for different cells, thus avoiding any visible artifacts caused by data line interference.

As noted above, the later discussed embodiments can be performed without discharging the cells. Thus, the various cells and display pixels can be emitting light while touch scanning is performed. Therefore, it may be important to ensure that the touch scan process does not cause significant changes in the voltages across the comb electrodes of the various cells, thus causing undesirable visual artifacts.

If a given cell of either type is connected to a stimulus signal, then the common line (common column line for cells of type A or common row line for cells of type B) can send the stimulus signal into the cell. The common line can excite the common electrode with a stimulus signal. The given cell can be lit, i.e., there can be an existing voltage between the driven and counter electrodes signifying that the cell is currently producing light. Since the TFT switch is open (i.e., non-conducting), and there is a storage capacitance Cst at each pixel between the counter electrode and the data electrodes, then, in ideal conditions, applying the stimulus signal as part of step 1502 or 1504 should not change the voltage between the electrodes. In other words the common mode voltage of both electrodes may be modulating, due to the common line being driven, and Cst of the pixel, however because the TFT switch is open, then the Cst can hold the same differential voltage across the two electrodes, so that there is no change to the field seen by the liquid crystal.

However, the conditions of operation may differ from the ideal. Specifically, parasitic capacitance at transistor 205 can affect the voltage changes of the driven electrode that result from the stimulation signal so that they are not identical to those of the counter electrode. Therefore, a slight artifact, or a change of color can occur for regions of the type that is currently being stimulated. In order to make this artifact unnoticeable, steps 1502 and 1504 can be performed in quick succession, thus changing the regions that are being stimulated and at which the artifact appears. Since the human eye may not be able to discern such a quick switch of the stimulated regions, if the artifact is noticeable at all it may appear to affect the whole display. This can be corrected by performing a gamma correction on the entire display. Thus, most or all visible traces of the artifact caused by touch sensing can be removed.

Thus, according to embodiments of the invention, multi-touch sensing can be performed at the same TFT substrate of an LCD display in which display related functions are performed. Furthermore, the touch sensing and display related functions can share much of the same circuitry. This can greatly reduce the cost and improve the efficiency of multi-touch capable displays.

A multi-touch capable display may be used in various devices. Thus, embodiments of this invention encompass but are not limited to devices such as cellular phones, portable music players, GPS devices, PDAs, portable email devices, electronic kiosks, computers, and other devices utilizing multi-touch displays.

In the above discussed embodiments, references to ground or 0V can actually refer to a virtual ground voltage, even if that voltage is at a different value than 0V. Unless explicitly noted otherwise (e.g., by referring to a "touch pixel"), the term "pixel" can refer to a display pixel.

Although embodiments of the invention are described herein in terms of in-plane switching LCD displays, it should be understood that the invention is not limited to this type of display, but is generally applicable to other displays as well.

Although the invention has been fully described in connection with embodiments thereof with reference to the accompanying drawings, it is to be noted that various changes and modifications will become apparent to those skilled in the art. Such changes and modifications are to be understood as being included within the scope of the invention as defined by the appended claims.

What is claimed is:

1. A method of operating a display for displaying data and providing touch sensing, the display having a plurality of cells, each cell having a driven electrode, a counter electrode and a storage capacitor configured in an IPS arrangement, some of the plurality of cells comprising first type cells having their counter electrodes connected to ones of a first plurality of lines and others of the plurality of cells comprising second type cells having their counter electrodes connected to ones of a second plurality of lines, the method comprising:

coupling a plurality of data lines to the driven electrode of the plurality of cells during a display time period to thereby display data on the display, the data lines coupled through switching devices controlled by gate lines;

driving the plurality of data lines with data signals during the display time period in order to create voltage differentials between the driven and counter electrodes of one or more cells of the plurality of cells;

the storage capacitor coupling the driven and counter electrodes;

while not driving the plurality of data lines, driving at least one of (1) the first plurality of lines connected to the first type cells with a stimulation signal, such that the stimulation signal is applied to one plate of the storage capacitor and connecting the second plurality of lines connected to the second type cells with one or more sensor circuits or (2) driving the second plurality of lines connected to the second type cells with a stimulation signal such that the stimulation signal is applied to one plate of the storage capacitor and connecting the first plurality of lines connected to the first type cells with one or more sensor circuits; and wherein the first plurality of lines and the second plurality of lines are distinct from the gate lines and the data lines.

2. The method of claim 1, wherein the sensing circuits comprise charge amplifier circuits.

3. The method of claim 2, further comprising, performing a gamma correction at the display.

4. A multi-touch enabled display comprising:

a plurality of data lines;

a plurality of cells, each cell including a driven electrode and a counter electrode, the driven electrodes of the plurality of cells being connected to the plurality of data lines during a first time period;

a plurality of first lines wherein a plurality of first type cells of the plurality of cells is such that the counter electrode of each first type cell is connected to one of the plurality of first lines;

a plurality of second lines wherein a plurality of second type cells of the plurality of cells is such that the counter electrode of each second type cell is connected to a one of the plurality of second lines; and control circuitry configured to:

drive the plurality of data lines with data signals during the first time period in order to create voltage differentials between the driven and counter electrodes of one or more cells of the plurality of cells;

drive the plurality of first lines connected to the first type cells with a stimulation signal during a second time period, so that the stimulation signal does not significantly change the voltage differentials between the electrodes of the first type cells;

connect the plurality of second lines connected to the second type cells with one or more sensor circuits during the second time period;

drive the plurality of second lines connected to the second type cells with a stimulation signal during a third time period, so that the stimulation signal does not significantly change the voltage differentials between the electrodes of the second type cells; and connect the plurality of first lines connected to the first type cells with one or more sensor circuits during the third time period.

5. The multi-touch enabled display of claim 4, wherein the sensor circuits comprise charge amplifier circuits.

6. The multi-touch enabled display of claim 4, wherein the control circuit is further configured to perform gamma correction during the second and third time periods in order to compensate for minor changes in the voltage differentials between the electrodes of the first type cells during the second time period and the second type cells during the third time period.

7. The multi touch enabled display of claim 4, wherein the plurality of first lines are substantially parallel common column lines and the plurality of second lines are substantially parallel common row lines which are substantially perpendicular to the common column lines.

8. A multi-touch enabled device comprising the multi-touch display of claim 4.

9. A multi-touch enabled mobile phone comprising the multi-touch display of claim 4.

10. A multi-touch enabled audio player comprising the multi-touch display of claim 4.

11. The multi-touch enabled display of claim 4 further comprising:
a plurality of switches for connecting the plurality of driven electrodes of the plurality of cells to the plurality of data lines during the first time period.

12. The multi-touch enabled display of claim 11 wherein the control circuitry is operative to:
actuate the plurality of switches to connect data lines in sequence to groups of the driven electrodes of the plurality of cells disposed along a given direction.

13. The multi-touch enabled display of claim 12 wherein the control circuitry is operative to
actuate the plurality of switches to disconnect the data lines from the driven electrodes of the plurality of cells during the second and third time periods.

14. The multi-touch enabled display of claim 4 wherein the plurality of cells each comprise a storage capacitor and the control circuitry is operative to disconnect the driven electrodes of the plurality of cells from the plurality of data lines during the second and third time periods.

15. The multi-touch enabled display of claim 14, wherein the storage capacitor is disposed between each of the plurality of driven and counter electrodes, and a common mode voltage is established between the driven and counter electrodes of the first type and second type cells when the driven electrodes are driven during the second and third time periods respectively.

16. The multi-touch enabled display of claim 4, wherein the control circuitry is configured to ground the data lines during the second and third time periods.

17. The multi-touch enabled display of claim 11, wherein the control circuitry is configured to ground the data lines during the second and third time periods.

18. The multi-touch enabled display of claim 4 wherein the driven and counter electrodes of each of the plurality of cells are disposed in an in-plane switching arrangement.

19. The multi-touch enabled display of claim 18, wherein the driven and counter electrodes of each of the plurality of cells are disposed in an interdigitated comb-shaped arrangement.

20. A method of operating a display for displaying data and providing touch sensing, the display having a plurality of cells, each cell having a driven electrode and a counter electrode, some of the plurality of cells comprising first type cells having their counter electrodes connected to ones of a first plurality of lines and others of the plurality of cells comprising second type cells having their counter electrodes connected to ones of a second plurality of lines, the method comprising:
connecting a plurality of data lines to the driven electrode of the plurality of cells during a first time period to thereby display data on the display;
driving the plurality of data lines with data signals during the first time period in order to create voltage differentials between the driven and counter electrodes of one or more cells of the plurality of cells;
driving the first plurality of lines connected to the first type cells with a stimulation signal during a second time period, such that the stimulation signal does not significantly change the voltage differentials between the electrodes of the first type cells;
connecting the second plurality of lines connected to the second type cells with one or more sensor circuits during the second time period;
driving the second plurality of lines connected to the second type cells with a stimulation signal during a third time period, such that the stimulation signal does not significantly change the voltage differentials between the electrodes of the second type cells; and
connecting the first plurality of lines connected to the first type cells with the one or more sensor circuits during the third time period.

21. The method of claim 20, further comprising grounding the data lines during the second and third time periods.

22. The method of claim 20, further comprising disconnecting the data lines from the driven electrodes of the plurality of cells during the second and third time periods.

23. The method of claim 22, further comprising grounding the data lines during the second and third time periods.

24. A touch screen comprising an in-plane-switching (IPS) liquid crystal display with integral touch sensing, the touch screen comprising:
a plurality of gate lines;
a plurality of data lines;
a pair of electrodes for each of a plurality of display pixels, the pair of electrodes disposed in an in-plane-switching arrangement;
a driven electrode being one of the pair of electrodes;
a counter electrode being the other of the pair of electrodes;
the plurality of data lines transmitting display data to the driven electrodes of the plurality of display pixels; and
a plurality of switches, operative in a display mode of operation and responsive to the plurality of gate lines, for connecting the data lines to the driven electrodes of the plurality of display pixels;
a first plurality of display pixels having first groups of display pixels disposed along a first direction, each of the first groups having counter electrodes connected together by a common first line;
a second plurality of display pixels having second groups of display pixels disposed along a second direction, each of the second groups having counter electrodes connected together by a common second line;
the common first lines and the common second lines distinct from the gate lines and the data lines; and
during a touch sensing mode of operation,
a stimulation signal is applied to at least one of (1) a plurality of the common first lines while capacitance sensing circuitry is coupled to a plurality of the common second lines or (2) a stimulation signal is applied to the plurality of the common second lines while capacitance sensing circuitry is coupled to a plurality of the common first lines.

25. The touch screen of claim 24, wherein the data lines are held at a constant potential during the touch sensing mode of operation.

26. A touch screen comprising an in-plane-switching liquid crystal display with integral touch sensing, the touch screen having a plurality of touch pixels responsive to a touch or near touch of the touch screen wherein the touch screen comprises:
a plurality of display pixels each having first and second electrodes disposed adjacent one another in an in-plane switching arrangement; a select terminal, a data terminal and a common terminal, the display pixels used during a display mode of operation;

first type pixels, each having first and second electrodes disposed adjacent one another in an in-plane switching arrangement; a select terminal, a data terminal and a common terminal with common terminals of adjacent first type pixels electrically connected together to form touch sensing columns, the first type pixels used at least during a touch sensing mode of operation;

second type pixels each having first and second electrodes disposed adjacent one another in an in-plane switching arrangement; a select terminal, a data terminal and a common terminal with common terminals of adjacent second type pixels electrically connected together to form touch sensing row, the second type pixels used at least during a touch sensing mode of operations;

a first column group formed by first type pixels and display pixels disposed in one or more columns, wherein a ratio of display pixels to first type pixels is X:1, where X is an integer greater than 1;

a second column group formed by second type pixels and display pixels disposed in one or more columns, wherein a ratio of display pixels to second type pixels is X:1, where X is an integer greater than 1 the second column group disposed adjacent the first column group;

wherein during a touch sense mode of operation,
a stimulation signal is alternately applied to the plurality of touch sensing rows and the plurality of touch sensing columns; and
a capacitance sensing circuitry alternately coupled to the plurality of touch sensing columns and the plurality of touch sensing rows.

27. A touch screen comprising a liquid crystal display with integral touch sensing, the touch screen having a plurality of touch pixels responsive to a touch or near touch of the touch screen wherein the touch screen comprises:

first type pixels, each having first and second electrodes disposed adjacent one another in an in-plane switching arrangement; a select terminal, a data terminal and a common terminal with common terminals of adjacent first type pixels electrically connected together to form touch sensing columns;

second type pixels each having first and second electrodes disposed adjacent one another in an in-plane switching arrangement; a select terminal, a data terminal and a common terminal with common terminals of adjacent second type pixels electrically connected together to form touch sensing rows;

a plurality of switches operative in a display mode to connect the data terminals of the first type and second type pixels to data lines;

a first group of first type pixels disposed in one or more columns;

a first group of second type pixels disposed in one or more columns, adjacent the first group of first type pixels;

a second group of first type pixels disposed in one or more columns adjacent the first group of second type pixels;

a second group of second type pixels disposed in one or more columns adjacent the second group of first type pixels; and wherein the first group of first type pixels, the adjacent first group of second type pixels, the adjacent second group of first type pixels and the adjacent second group of second type pixels form alternating first type and second type pixels columns; and the plurality of switches operative in a touch sensing mode to disconnect the data terminals of the first type and second type pixels from the data lines.

28. The touch screen as recited in claim 27, wherein the common terminals of the second type pixels are connected together with a common row line, and the common row line interconnects the first and second groups of second type pixels while electrically bypassing the first type pixels.

29. The touch screen as recited in claim 28, further comprising:
during a touch sensing function, the second electrodes of the first type pixels alternately connected to an alternating voltage touch stimulation signal and a capacitance measurement circuit, and the second electrode of the second type pixels alternatively connected to the capacitance measurement circuit and the alternating voltage touch stimulation signal;
wherein the capacitance measurement circuit enables capacitance measurements which change when a touch object approaches the first and second electrodes.

30. The touch screen as recited in claim 29, wherein the common terminals of the second type pixels are connected together with a common row line, and the common row line interconnects the first and second groups of second type pixels while electrically bypassing the first type pixels.

31. The touch screen of claim 24, wherein the plurality of switches are operative to disconnect the data lines from the driven electrodes during the touch sensing mode.

32. The touch screen of claim 31, wherein the data lines are held at a constant potential during the touch sensing mode of operation.

* * * * *